(12) United States Patent
Kadowaki (10) Patent No.: US 12,443,319 B2
(45) Date of Patent: Oct. 14, 2025

(54) SENSOR PANEL AND ELECTRONIC EQUIPMENT

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/364,367

(22) Filed: Aug. 2, 2023

(65) Prior Publication Data

US 2024/0045550 A1     Feb. 8, 2024

(30) Foreign Application Priority Data

Aug. 5, 2022   (JP) ................................. 2022-125731

(51) Int. Cl.
*G06F 3/044*     (2006.01)
*G06F 3/041*     (2006.01)

(52) U.S. Cl.
CPC .......... *G06F 3/0442* (2019.05); *G06F 3/0412* (2013.01); *G06F 3/04164* (2019.05); *G06F 3/0446* (2019.05); *G06F 2203/04112* (2013.01)

(58) Field of Classification Search
CPC .. G06F 3/0442; G06F 3/0446; G06F 3/04164; G06F 3/0412; G06F 2203/04112
See application file for complete search history.

(56) References Cited

U.S. PATENT DOCUMENTS

| 10,949,016 | B2* | 3/2021 | Teranishi | G06F 3/0445 |
| 2014/0232663 | A1* | 8/2014 | Singh | G06F 3/0418 |
| | | | | 345/173 |
| 2015/0055028 | A1* | 2/2015 | Lin | G06F 3/0446 |
| | | | | 349/12 |
| 2016/0132135 | A1* | 5/2016 | Oda | G06F 3/03545 |
| | | | | 345/174 |
| 2016/0149156 | A1* | 5/2016 | Kim | H10K 50/828 |
| | | | | 438/46 |
| 2016/0306497 | A1* | 10/2016 | Nagai | G06F 3/03545 |
| 2017/0220163 | A1* | 8/2017 | Kurasawa | G06F 3/04166 |
| 2018/0018029 | A1* | 1/2018 | Lim | G06F 3/0446 |
| 2019/0004657 | A1* | 1/2019 | Koudo | G06F 3/047 |
| 2019/0212836 | A1* | 7/2019 | Kadowaki | G06F 3/03545 |
| 2020/0089343 | A1* | 3/2020 | Kadowaki | G06F 3/0442 |

FOREIGN PATENT DOCUMENTS

JP      7059042 B2    4/2022

* cited by examiner

*Primary Examiner* — Kenneth Bukowski
(74) *Attorney, Agent, or Firm* — Seed Intellectual Property Law Group LLP (57) ABSTRACT

Disclosed herein is a sensor panel which overlaps a display device and is connected to an integrated circuit that detects a position of an active pen at least in an active area of the display device, the sensor panel including a plurality of first electrodes that each extend in a first direction and are juxtaposed in a second direction different from the first direction, the plurality of first electrodes being connected to the integrated circuit by first routing lines different from each other, in which the plurality of first electrodes includes first and second outside electrodes located at respective ends the plurality of first electrodes in the second direction, and a plurality of first inside electrodes that are different from the first and second outside electrodes, each of the first and second outside electrodes is a solid conductor, and each the plurality of first inside electrodes is a mesh conductor.

12 Claims, 5 Drawing Sheets

SENSOR PANEL AND ELECTRONIC EQUIPMENT

BACKGROUND

Technical Field

The present disclosure relates to a sensor panel and electronic equipment and particularly to a sensor panel used in such a manner as to be disposed to overlap with a display device and electronic equipment including the sensor panel.

Description of the Related Art

In electronic equipment of a tablet type having a function of detecting a position of a finger or stylus, a sensor panel is disposed to overlap with a display panel. The sensor panel has, in a region that overlaps with an active area (display region) of the display panel, multiple linear electrodes including multiple x-electrodes that each extend in a y-direction and are disposed at equal intervals in an x-direction and multiple y-electrodes that each extend in the x-direction and are disposed at equal intervals in the y-direction. They are connected to an integrated circuit (sensor controller) that executes detection processing of a finger or a stylus through the respective multiple interconnects and flexible printed circuits (FPC) connection terminals disposed in a region that overlaps with a bezel region of the display panel.

Moreover, an active pen is known as one kind of stylus. The active pen is a stylus that includes a power supply part and a signal processing circuit and is configured to be capable of transmitting a pen signal by supplying a charge according to a signal generated by the signal processing circuit to an electrode (pen electrode) disposed near a pen tip. At the time of detection of the active pen, the pen signal is received by the linear electrode that exists near the pen tip in the multiple linear electrodes in the sensor panel and is supplied to the sensor controller through the above-described FPC connection terminal. The sensor controller detects a position of the active pen in a touch surface by deciding the x-coordinate of the active pen on the basis of the reception level of the pen signal at each x-electrode and deciding the y-coordinate of the active pen on the basis of the reception level of the pen signal at each y-electrode.

In Japanese Patent No. 7059042 (hereinafter, Patent Document 1), an example of electronic equipment that executes position detection of an active pen is disclosed. Multiple linear electrodes disposed in the electronic equipment according to this example are disposed in accordance with an active area circumferential side cover system. The active area circumferential side cover system is a system in which the reception level of the pen signal at a linear electrode disposed outside the active area is also used to detect a position of the pen in the active area, and the arrangement of the multiple linear electrodes needs to be decided in such a manner that center lines in the extension direction regarding the linear electrodes located at endmost positions (outside electrodes) correspond with the circumferential side of the active area or are located outside relative to the circumferential side. Patent Document 1 describes a technique in which a width of the outside electrodes is set smaller than the other electrodes in order to cause an area of the part that needs to be set outside the active area in the sensor panel to be made as small as possible in such an active area circumferential side cover system.

However, reduction in a width of the bezel has been further advanced in recent years, and a case in which the reduction in the area of the peripheral part is insufficient even with the technique of Patent Document 1 has occurred.

BRIEF SUMMARY

Therefore, embodiments of the present disclosure provide a sensor panel and electronic equipment that can implement further reduction in the width of a bezel of electronic equipment of a tablet type.

A sensor panel according to a first aspect of the present disclosure, in operation, is disposed to overlap with a display device and is connected to an integrated circuit that detects a position of an active pen at least in an active area of the display device. The sensor panel includes a plurality of first electrodes that each extend in a first direction and are juxtaposed in a second direction different from the first direction, the plurality of first electrodes being connected to the integrated circuit by first routing lines that are different from each other. The plurality of first electrodes includes first and second outside electrodes located at respective ends of the plurality of first electrodes in the second direction, and a plurality of first inside electrodes that are different from the first and second outside electrodes. Each of the first and second outside electrodes is a solid conductor. Each of the plurality of first inside electrodes is a mesh conductor.

A sensor panel according to a second aspect of the present disclosure, in operation, is disposed to overlap with a display device and is connected to an integrated circuit that detects a position of an active pen at least in an active area of the display device. The sensor panel includes a plurality of first electrodes that each extend in a first direction and are juxtaposed in a second direction different from the first direction, the plurality of first electrodes being connected to the integrated circuit by first routing lines that are different from each other. The plurality of first electrodes includes first and second outside electrodes located at respective ends of the plurality of first electrodes in the second direction, and a plurality of first inside electrodes that are different from the first and second outside electrodes. Each of the first and second outside electrodes is a non-transparent conductor. Each of the plurality of first inside electrodes are each configured by a transparent conductor.

An electronic equipment according to the first aspect of the present disclosure includes a sensor panel disposed to overlap with a display device; and an integrated circuit that is connected to the sensor panel, wherein the integrated circuit, in operation, detects a position of an active pen at least in an active area of the display device. The sensor panel includes a plurality of electrodes that each extend in a first direction and are juxtaposed in a second direction different from the first direction and are connected to the integrated circuit by routing lines that are different from each other. The plurality of electrodes includes first and second outside electrodes located at respective ends in the second direction, and a plurality of inside electrodes that are different from the first and second outside electrodes. The plurality of inside electrodes includes a first inside electrode and a second inside electrode sequentially from a closest inside electrode to the first outside electrode. Each of the first and second outside electrodes is a solid conductor. Each of the plurality of inside electrodes is a mesh conductor. The integrated circuit, in operation, detects a reception intensity at each of the plurality of electrodes regarding a position signal transmitted by the active pen. The integrated circuit, in operation, decides a position of the active pen in the second direction based on the reception intensity detected at each of the first outside electrode, the first inside electrode, and the second inside electrode when the reception intensity detected at the first inside electrode is highest and the reception intensity detected at each of the plurality of electrodes.

An electronic equipment according to the second aspect of the present disclosure includes a sensor panel disposed to overlap with a display device; and an integrated circuit that is connected to the sensor panel, wherein the integrated circuit detects a position of an active pen at least in an active area of the display device. The sensor panel includes a plurality of electrodes that each extend in a first direction and are juxtaposed in a second direction different from the first direction and are connected to the integrated circuit by routing lines that are different from each other. The plurality of electrodes includes first and second outside electrodes located at respective ends in the second direction, and a plurality of inside electrodes that are different from the first and second outside electrodes. The plurality of inside electrodes includes a first inside electrode and a second inside electrode sequentially from a closest inside electrode to the first outside electrode. Each of the first and second outside electrodes is a non-transparent conductor. Each of the plurality of inside electrodes is a transparent conductor. The integrated circuit, in operation, detects a reception intensity at each of the plurality of electrodes regarding a position signal transmitted by the active pen. The integrated circuit, in operation, decides a position of the active pen in the second direction based on the reception intensity detected at each of the first outside electrode, the first inside electrode, and the second inside electrode when the reception intensity detected at the first inside electrode is highest among the reception intensity detected at each of the plurality of electrodes.

According to the first and second aspects of the present disclosure, while the whole of the first and second outside electrodes needs to be disposed outside the active area, the width of each of the first and second outside electrodes in the second direction can be set considerably smaller than the width of each of the plurality of first inside electrodes in the second direction. Thus, as a result, the area of the part that needs to be set outside the active area in the sensor panel can be made smaller than the existing configuration. Therefore, further reduction in the width of the bezel of the electronic equipment of a tablet type can be implemented.

DETAILED DESCRIPTION

An embodiment of the present disclosure will be described in detail below with reference to the accompanying drawings.

Figure 1:
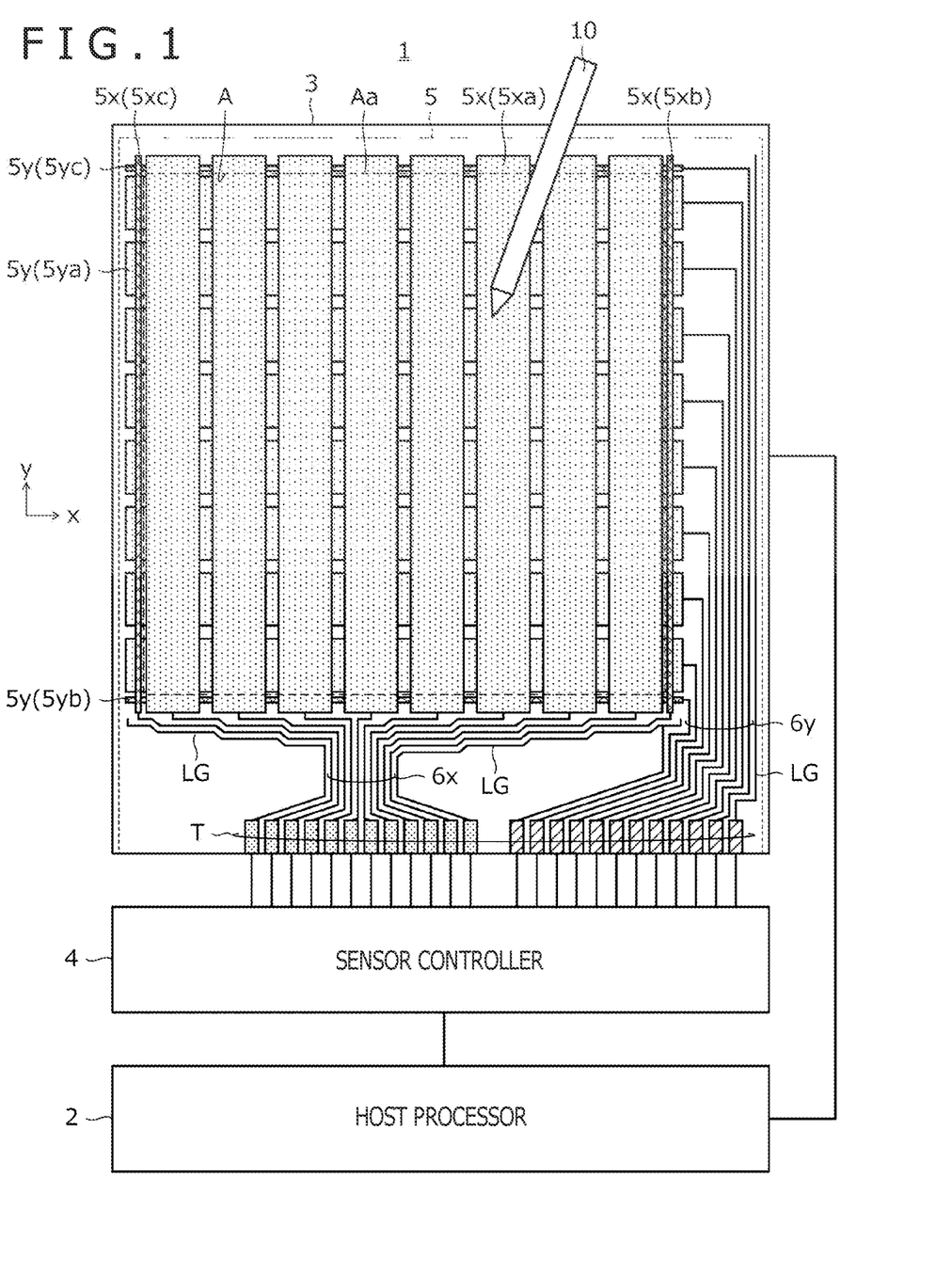
FIG. 1 is a schematic diagram illustrating a configuration of electronic equipment and an active pen according to an embodiment of the present disclosure.
Figure 2:
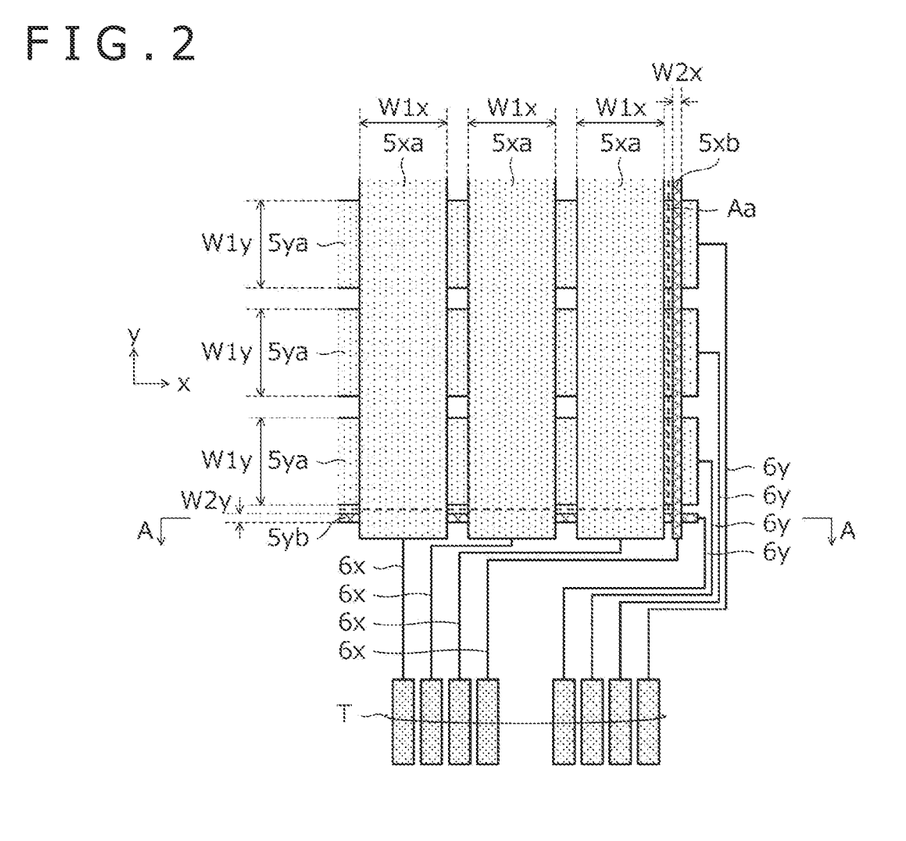
FIG. 2 is a diagram that schematically enlarges part of a sensor panel illustrated in FIG. 1.
Figure 3:
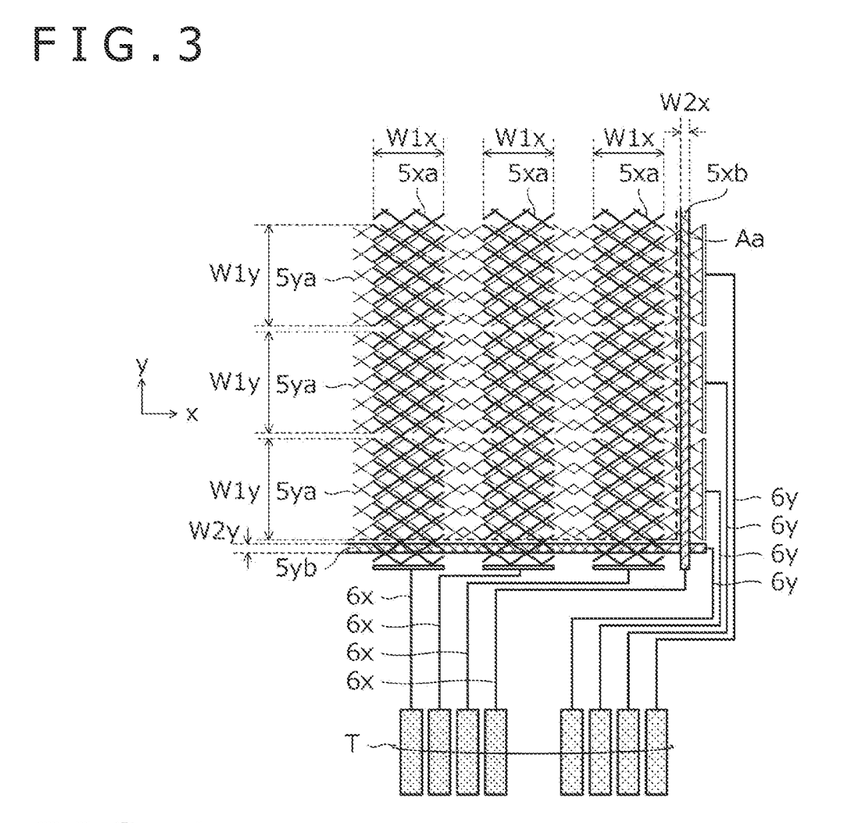
FIG. 3 is a diagram that schematically enlarges part of the sensor panel illustrated in FIG. 1 (when inside electrodes are configured by mesh conductors)
Figure 4:
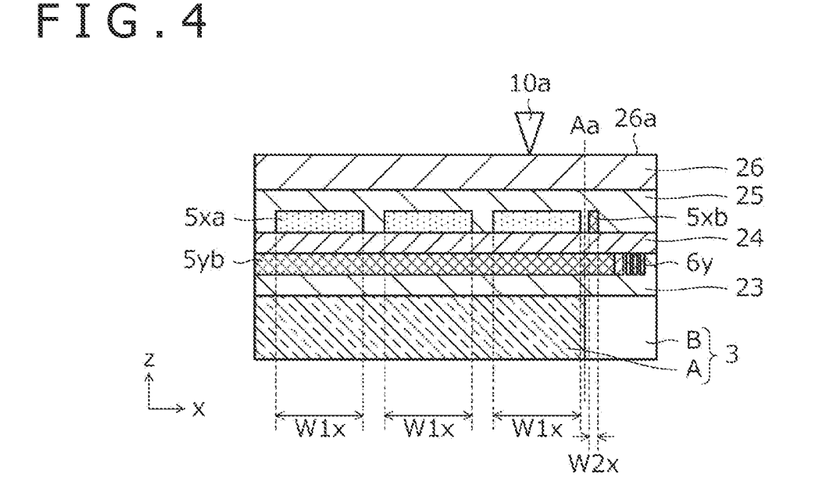
FIG. 4 is a schematic sectional view of the electronic equipment corresponding to line A-A illustrated in FIG. 2.

FIG. 1 is a diagram illustrating a configuration of electronic equipment 1 and an active pen 10 according to a first embodiment of the present disclosure. Moreover, FIG. 2 and FIG. 3 are diagrams that schematically enlarge part of a sensor panel 5 illustrated in FIG. 1. FIG. 4 is a schematic sectional view of the electronic equipment 1 corresponding to line A-A illustrated in FIG. 2. FIG. 2 to FIG. 4 are schematic diagrams and therefore do not necessarily correspond with FIG. 1.

The electronic equipment 1 according to the present embodiment is a computer of a tablet type, for example, and is configured to have a host processor 2, a display panel 3, a sensor controller 4, and the sensor panel 5 as illustrated in FIG. 1.

The host processor 2 is a central processing device of the electronic equipment 1 and executes control of the respective parts of the electronic equipment 1 including the display panel 3 and the sensor controller 4 that are illustrated and various kinds of processing such as execution of various applications including an application for rendering by reading out a program stored in a memory that is not illustrated and executing the program. In the memory, a main memory such as a dynamic random access memory (DRAM) and an auxiliary storing device such as a flash memory are included.

The display panel 3 is a display device having an active area A and a bezel region B illustrated in FIG. 4. The active area A is a rectangular region in which multiple pixels (not illustrated) are disposed in a matrix manner. A drive circuit (not illustrated) disposed in the display panel 3 is subjected to control by the host processor 2 and drives these pixels to execute optional display in the active area A. The bezel region B is a strip-shaped region set between a circumferential side Aa of the active area A and the outer edge of the display panel 3. The above-described drive circuit and interconnects (not illustrated) that connect the pixels in the active area A to the drive circuit are disposed in the bezel region B. As specific examples of the display panel 3, a liquid crystal display, an organic electroluminescence (EL) display, electronic paper, and so forth are cited.

The sensor controller 4 and the sensor panel 5 are input devices for the host processor 2. The sensor controller 4 is an integrated circuit (IC) that detects positions of the active pen 10 and a finger (not illustrated) of the user at least in the active area A of the display panel 3. The sensor controller 4 may be what detects and outputs the positions of the active pen 10 and a finger of the user also outside the active area A in addition to inside the active area A. Moreover, that the sensor controller 4 has the function of detecting a position of a finger is not essential in the present disclosure. The sensor panel 5 is a device used in such a manner as to be disposed to overlap with the display panel 3 and is connected to the sensor controller 4.

First, the sensor panel 5 will be described in detail. The sensor panel 5 is configured to include the multiple linear electrodes 5x and 5y and the multiple interconnects 6x and 6y illustrated in FIG. 1 to FIG. 4, multiple guard interconnects LG illustrated in FIG. 1, and an adhesive sheet 23, a film 24, an adhesive sheet 25, and a cover component 26, which are illustrated in FIG. 4.

As illustrated in FIG. 1, the multiple linear electrodes 5x (first electrodes) each extend in a y-direction (first direction) and are juxtaposed in an x-direction (second direction different from the first direction) orthogonal to the y-direction. In the following, the two linear electrodes located at both ends in the x-direction in the multiple linear electrodes $5x$ will be referred to as outside electrodes $5xb$ and $5xc$ (first and second outside electrodes), respectively, and the linear electrodes $5x$ other than the outside electrodes $5xb$ and $5xc$ will be referred to as inside electrodes $5xa$ (first inside electrodes), and they will be discriminated in some cases. The outside electrodes $5xb$ and $5xc$ are each disposed outside the active area A. The respective linear electrodes $5x$ are connected to the sensor controller 4 through the interconnects $6x$ (first routing lines) and FPC connection terminals T which are different from each other.

Moreover, as illustrated in FIG. 1, the multiple linear electrodes $5y$ (second electrodes) each extend in the x-direction and are juxtaposed in the y-direction. In the following, the two linear electrodes located at both ends in the y-direction in the multiple linear electrodes $5y$ will be referred to as outside electrodes $5yb$ and $5yc$ (third and fourth outside electrodes), respectively, and the linear electrodes $5y$ other than the outside electrodes $5yb$ and $5yc$ will be referred to as inside electrodes $5ya$ (second inside electrodes), and they will be discriminated in some cases. The outside electrodes $5yb$ and $5yc$ are each disposed outside the active area A. The respective linear electrodes $5y$ are connected to the sensor controller 4 through the interconnects $6y$ (second routing lines) and the FPC connection terminals T which are different from each other. In FIG. 1 and FIG. 2, all linear electrodes $5y$ are connected to the interconnects $6y$ on the same side in the x-direction. However, the respective linear electrodes $5y$ may be connected to the interconnects $6y$ at end parts on the right side and the left side of the drawing alternately from the outside electrode $5yb$ to the outside electrode $5yc$. Moreover, from the outside electrode $5yb$ to the outside electrode $5yc$, some (for example, half on the upper side of the drawing) of the respective linear electrodes $5y$ may be connected to the interconnects $6y$ on the right side of the drawing and the rest (for example, half on the lower side of the drawing) may be connected to the interconnects $6y$ on the left side of the drawing.

Excluding both end parts, the multiple inside electrodes $5xa$ and the multiple inside electrodes $5ya$ extended in the active area A need to allow transmission of light from the display panel 3 therethrough and therefore are configured by mesh conductors (see FIG. 3) obtained through being formed into a mesh shape or transparent conductors of indium tin oxide or the like. Both end parts mentioned here are end parts in the extension direction of the inside electrodes $5xa$ or $5ya$. That is, both end parts refer to end parts in the y-direction in the inside electrodes $5xa$ and refer to end parts in the x-direction in the inside electrodes $5ya$. These both end parts are disposed outside the active area A in some cases.

In FIG. 3, an example of the inside electrodes $5xa$ and $5ya$ configured by the mesh conductors is illustrated. When the inside electrodes $5xa$ and $5ya$ are configured by the mesh conductors as in this example, the shapes illustrated in FIG. 1 and so forth represent the outer shapes as a whole. In FIG. 3, the conductors that configure the inside electrodes $5xa$ are drawn thinner than the conductors that configure the inside electrodes $5ya$. This is for making discrimination on the drawing easy, and each width of the conductors that configure the inside electrodes $5xa$ and each width of the conductors that configure the inside electrodes $5ya$ may be the same value as each other.

On the other hand, the outside electrodes $5xb$, $5xc$, $5yb$, and $5yc$ and the interconnects $6x$ and $6y$ disposed outside the active area A do not need to allow transmission of light from the display panel 3 therethrough and therefore are configured by solid conductors that are non-transparent plate-shaped conductors obtained by solid forming in order to decrease the volume resistivity. These solid conductors may be silver interconnects formed by screen printing, for example. The outside electrodes $5xb$, $5xc$, $5yb$, and $5yc$ and the interconnects $6x$ and $6y$ may be the same kind of solid conductors (non-transparent conductors) or may be different kinds of solid conductors (non-transparent conductors).

As illustrated in FIG. 2 and FIG. 3, the width of each inside electrode $5xa$ in the x-direction is $W1x$, and the width of each of the outside electrodes $5xb$ and $5xc$ in the x-direction is $W2x$. Moreover, the width of each inside electrode $5ya$ in the y-direction is $W1y$, and the width of each of the outside electrodes $5yb$ and $5yc$ in the y-direction is $W2y$. Moreover, the width $W2x$ is a value significantly smaller than the width $W1x$, and the width $W2y$ is a value significantly smaller than the width $W1y$. The width $W1x$ and the width $W1y$ may be the same value or may be different values. Moreover, the width $W2x$ and the width $W2y$ may be the same value or may be different values.

In a typical example, the widths $W1x$ and $W1y$ are approximately 1.0 to 1.5 mm, whereas the widths $W2x$ and $W2y$ are 0.1 to 0.2 mm. This is because of the following reason. The outside electrodes $5xb$, $5xc$, $5yb$, and $5yc$, which do not need to allow transmission of light therethrough, can be formed with use of solid conductors as described above and have lower volume resistivity compared with the inside electrodes $5xa$ and $5ya$, which need to be configured by mesh conductors or transparent conductors in order to allow transmission of light therethrough. Thus, the outside electrodes $5xb$, $5xc$, $5yb$, and $5yc$ can allow a pen signal and a signal for detection to be described later to sufficiently pass therethrough even when being set thin.

As above, according to the sensor panel 5 according to the present embodiment, while the whole of the outside electrodes $5xb$, $5xc$, $5yb$, and $5yc$ needs to be disposed outside the active area A, the widths $W2x$ and $W2y$ of each of the outside electrodes $5xb$, $5xc$, $5yb$, and $5yc$ can be set considerably smaller than the widths $W1x$ and $W1y$ of each of the multiple inside electrodes $5xa$ and $5ya$. As a result, the area of the part that needs to be set outside the active area A in the sensor panel can be made smaller than the existing configuration.

The multiple guard interconnects LG are interconnects that play a role in establishing insulation between the multiple interconnects $6x$ and the multiple interconnects $6y$ and are wired to sandwich both sides of the multiple interconnects $6x$ and both sides of the multiple interconnects $6y$ as illustrated in FIG. 1. The multiple guard interconnects LG are also each connected to the sensor controller 4 through a corresponding one of the FPC connection terminals T. The sensor controller 4 is configured to supply a specific potential (fixed potential that does not temporally change) such as a ground potential to each guard interconnect LG.

The multiple guard interconnects LG are not an essential configuration. Moreover, the guard interconnects LG may be either solid conductors similar to the interconnects $6x$ and $6y$ or mesh conductors. Moreover, the guard interconnects LG may be used as electrodes for detecting whether or not a pen is present at a bezel position.

As illustrated in FIG. 4, the adhesive sheet 23, the film 24, the adhesive sheet 25, and the cover component 26 are stacked in that order from the side closer to the display panel 3 along a z-direction that is the direction perpendicular to the x-direction and the y-direction. The adhesive sheets 23 and 25 are configured by a transparent adhesive such as an optical clear adhesive (OCA) or optical clear resin (OCR). On the upper surface (surface on the side of the cover component 26) of the film 24, the multiple linear electrodes 5x, the multiple interconnects 6x, the multiple guard interconnects LG, and the multiple FPC connection terminals T each connected to a corresponding one of the multiple interconnects 6x and the multiple guard interconnects LG are disposed. The adhesive sheet 25 plays a role in covering them and fixing them to the film 24. Moreover, on the lower surface of the film 24, the multiple linear electrodes 5y, the multiple interconnects 6y, the multiple guard interconnects LG, and the multiple FPC connection terminals T each connected to a corresponding one of the multiple interconnects 6y and the multiple guard interconnects LG are disposed. The adhesive sheet 23 plays a role in covering them and fixing them to the film 24. If necessary, the interconnect formed on the upper surface of the film 24 and the interconnect formed on the lower surface of the film 24 may be mutually connected by a via-electrode that penetrates the film 24. As illustrated in FIG. 1, the multiple FPC connection terminals T are juxtaposed along one side parallel to the x-direction in the sensor panel 5 having a rectangular shape.

The upper surface of the cover component 26 configures a touch surface 26a that is a flat surface for making a touch by a pen tip 10a of the active pen 10 or a finger (not illustrated) of the user. At least in a region that overlaps with the active area A, the respective constituent components of the sensor panel 5 including this cover component 26 are configured by a transparent material or a non-transparent material (including the above-described mesh conductor) in which the arrangement density is designed to allow transmission of light so that the user can view an image displayed in the active area A through the sensor panel 5.

Next, the sensor controller 4 has a processor and a memory (neither is illustrated) and is disposed on a flexible printed circuit (FPC) board not illustrated or a rigid board not illustrated. The board on which the sensor controller 4 is disposed is pressure-bonded to the multiple FPC connection terminals T disposed in the interconnect region of the sensor panel 5 (a region that ranges around the rectangular region in which the linear electrodes 5x and 5y are extended; an installation region of the interconnects 6x and 6y), and the sensor controller 4 and each of the interconnects in the sensor panel 5 are electrically connected through this pressure bonding.

In terms of functions, the sensor controller 4 is configured to be capable of detecting an indicated position of the active pen 10 and a finger (not illustrated) of the user on the touch surface 26a and receiving a data signal transmitted by the active pen 10 through reading-out and execution of a program stored in the memory by the processor. The detection of the indicated position of the active pen 10 is executed by an active capacitive coupling system. On the other hand, the detection of the position of a finger of the user is executed by a capacitive system such as a mutual capacitance system or self-capacitance system, for example.

The mutual capacitance system is a system in which an indicated position of a finger of the user is acquired on the basis of change in the capacitance generated between the multiple linear electrodes 5x and 5y and the finger of the user. In the case of executing position detection according to the mutual capacitance system, the sensor controller 4 sequentially supplies a predetermined signal for detection to each of the multiple linear electrodes 5x and measures the potential of each of the multiple linear electrodes 5y each time. When a finger of the user is close to the intersection of certain linear electrode 5x and linear electrode 5y, part of a current that flows from the linear electrode 5x to the linear electrode 5y flows out toward the body of the user, and therefore the potential measured at the linear electrode 5y becomes low. The sensor controller 4 detects the indicated position by using this change in the potential. The position of a finger of the user may be detected by the self-capacitance system instead of the mutual capacitance system.

The active capacitive coupling system is a system in which a pen signal transmitted by the active pen 10 is received by the sensor panel 5 and an indicated position of the active pen 10 is detected on the basis of the result thereof. In the pen signal, a position signal that is an unmodulated burst signal and a data signal indicating various kinds of data relating to the active pen 10 are included. Writing pressure data indicating the pressure applied to the pen tip 10a of the active pen 10 and so forth are included in the various kinds of data. The active pen 10 may transmit the pen signal in response to receiving an uplink signal transmitted by the sensor controller 4 through the multiple linear electrodes 5x and 5y. In this case, it is preferable for the active pen 10 to decide specific contents of data to be transmitted by the data signal according to a command included in the uplink signal.

In the case of executing detection of an indicated position by the active capacitive coupling system, the sensor controller 4 receives the position signal by each of the multiple linear electrodes 5x and 5y and detects the indicated position of the active pen 10 on the basis of the intensity of the received position signal, that is, the voltage detected at the respective linear electrodes 5x and 5y. The sensor controller 4 executes this detection by the above-described active area circumferential side cover system. Moreover, the sensor controller 4 detects the data signal sent out by the active pen 10 by using the linear electrode closest to the detected indicated position in the multiple linear electrodes 5x and 5y. The sensor controller 4 may detect the data signal by not the linear electrode closest to the detected indicated position but one or more linear electrodes located in the vicinity of the detected indicated position.

FIG. 5 to FIG. 8 are diagrams for explaining the detection method of an indicated position by the sensor controller 4. In the following, with reference to these diagrams, the detection method of an indicated position by the active area circumferential side cover system will be described in detail. In addition, the reason that the linear electrodes 5x and 5y are disposed outside the active area A will also be described.

In FIG. 5 to FIG. 8, the outside electrode 5xb and three inside electrodes 5xa-1 to 5xa-3 being present sequentially from the side closest to the outside electrode 5xb are illustrated. Although description will be made below with focus on these four electrodes, the same applies also to the other linear electrodes 5x and 5y.

Figure 5:
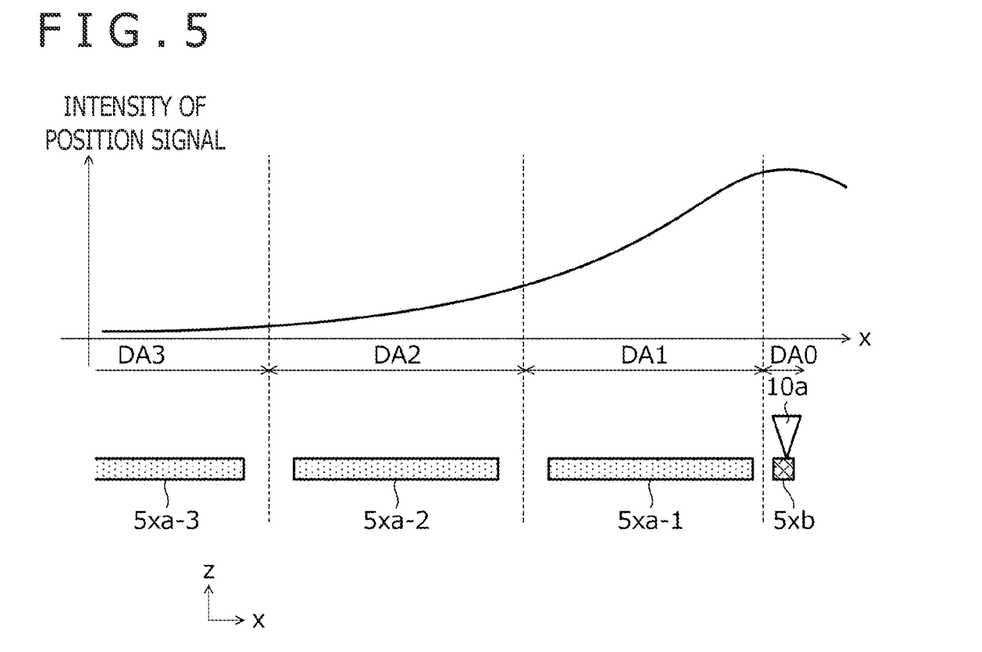
FIG. 5 is a diagram for explaining detection of an indicated position by a sensor controller.

In FIG. 5, an example of the distribution of the intensity (distribution in the x-direction) on the touch surface regarding the position signal transmitted by the active pen 10 is illustrated. This example is an example of a case in which the pen tip 10a of the active pen 10 is present above the outside electrode 5xb. As illustrated in FIG. 5, the intensity of the position signal transmitted by the active pen 10 becomes higher at a position closer to the pen tip 10a. Therefore, the reception intensity of the position signal at each linear electrode 5x also becomes higher when the linear electrode 5x is closer to the pen tip 10a. A region DA0 illustrated in FIG. 5 is a region in which the reception intensity of the position signal becomes the highest at the outside electrode 5xb. Regions DA1 to DA3 are also similar and are regions in which the reception intensity of the position signal becomes the highest at the inside electrodes 5xa-1 to 5xa-3, respectively.

Figure 6:
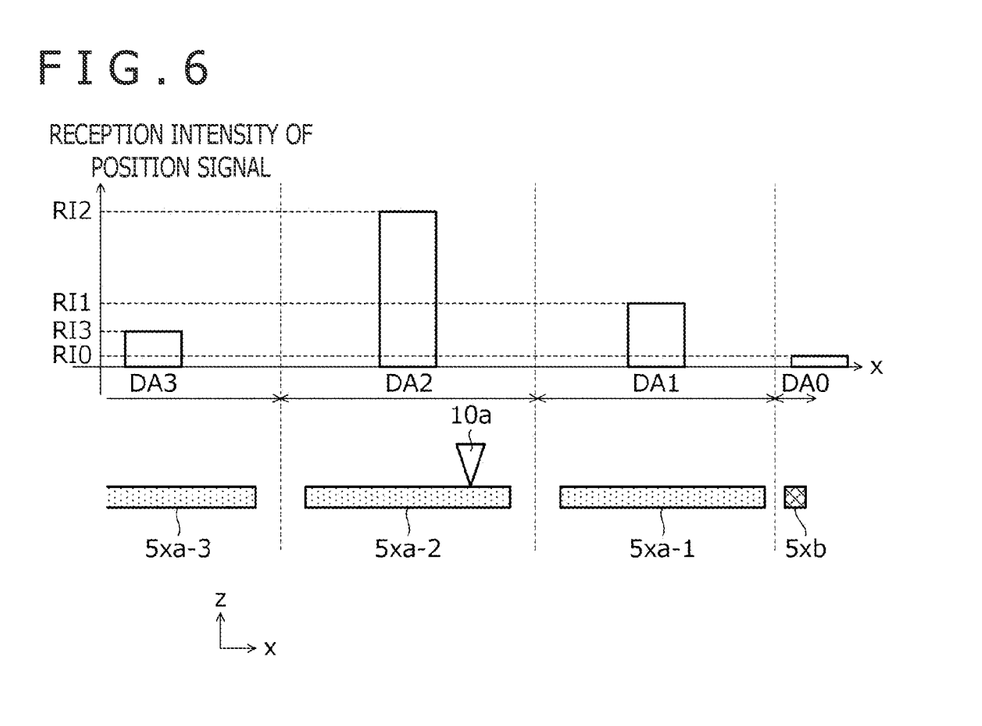
FIG. 6 is a diagram for explaining detection of an indicated position by the sensor controller.

In FIG. 6, an example of the reception intensity of the position signal at each linear electrode when the pen tip 10a of the active pen 10 is present in the region DA2 is illustrated. Illustrated reception intensities RI0 to RI3 are the reception intensities of the position signal at the outside electrode 5xb, the inside electrode 5xa-1, the inside electrode 5xa-2, and the inside electrode 5xa-3, respectively. When the pen tip 10a of the active pen 10 is present in the region DA2 as in this example, the sensor controller 4 detects the x-coordinate of the pen tip 10a by referring to not only the highest reception intensity RI2 detected at the inside electrode 5xa-2 but also the reception intensities RI1 and RI3 detected at two inside electrodes 5xa-1 and 5xa-3, respectively, being present on both sides of the inside electrode 5xa-2.

Description will be specifically made. First, the sensor controller 4 compares the reception intensity RI1 and the reception intensity RI3. Then, in the case of RI1=RI3, the sensor controller 4 determines that the pen tip 10a is present above the center line of the inside electrode 5xa-2 in the x-direction. The sensor controller 4 in this case decides the x-coordinate of the center line of the inside electrode 5xa-2 in the x-direction as the x-coordinate of the pen tip 10a. Moreover, in the case of RI1>RI3, the sensor controller 4 determines that the pen tip 10a is present at a position that deviates from the center line of the inside electrode 5xa-2 in the x-direction toward the side of the inside electrode 5xa-1. The sensor controller 4 in this case also determines the magnitude of the deviation on the basis of the reception intensities RI1 and RI2 and decides the x-coordinate of the pen tip 10a on the basis of the result thereof. On the other hand, in the case of RI1<RI3, the sensor controller 4 determines that the pen tip 10a is present at a position that deviates from the center line of the inside electrode 5xa-2 in the x-direction toward the side of the inside electrode 5xa-3. The sensor controller 4 in this case also determines the magnitude of the deviation on the basis of the reception intensities RI2 and RI3 and decides the x-coordinate of the pen tip 10a on the basis of the result thereof. The sensor controller 4 sequentially determines whether or not deviation is present, the direction of deviation, and the magnitude of deviation as above and detects the x-coordinate of the pen tip 10a on the basis of the result thereof.

Figure 7:
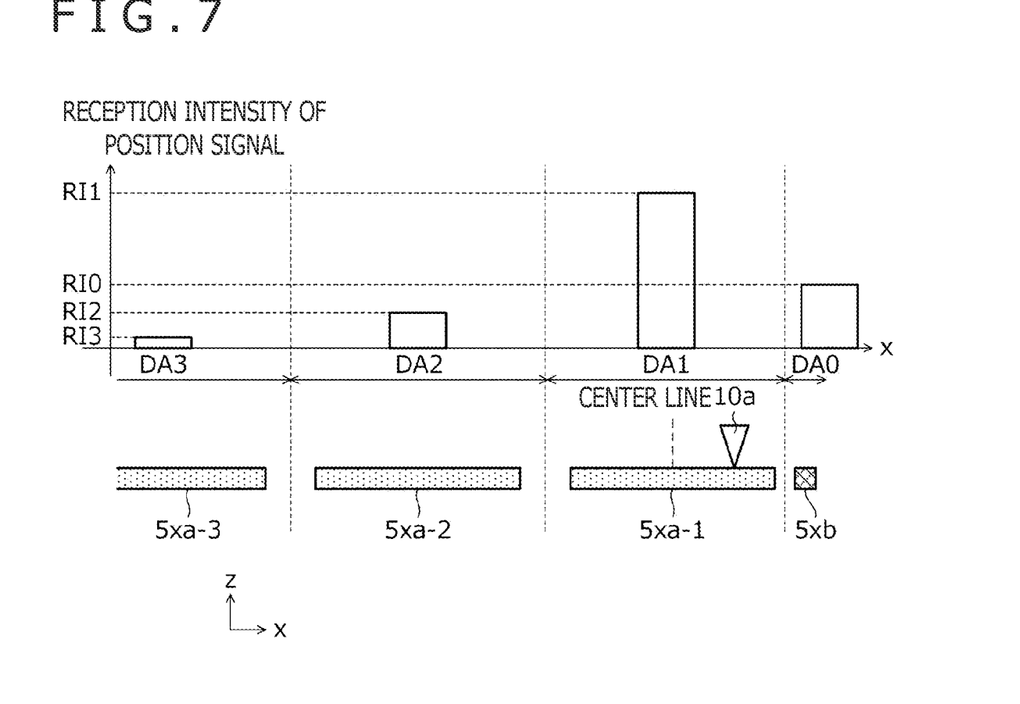
FIG. 7 is a diagram for explaining detection of an indicated position by the sensor controller.
Figure 8:
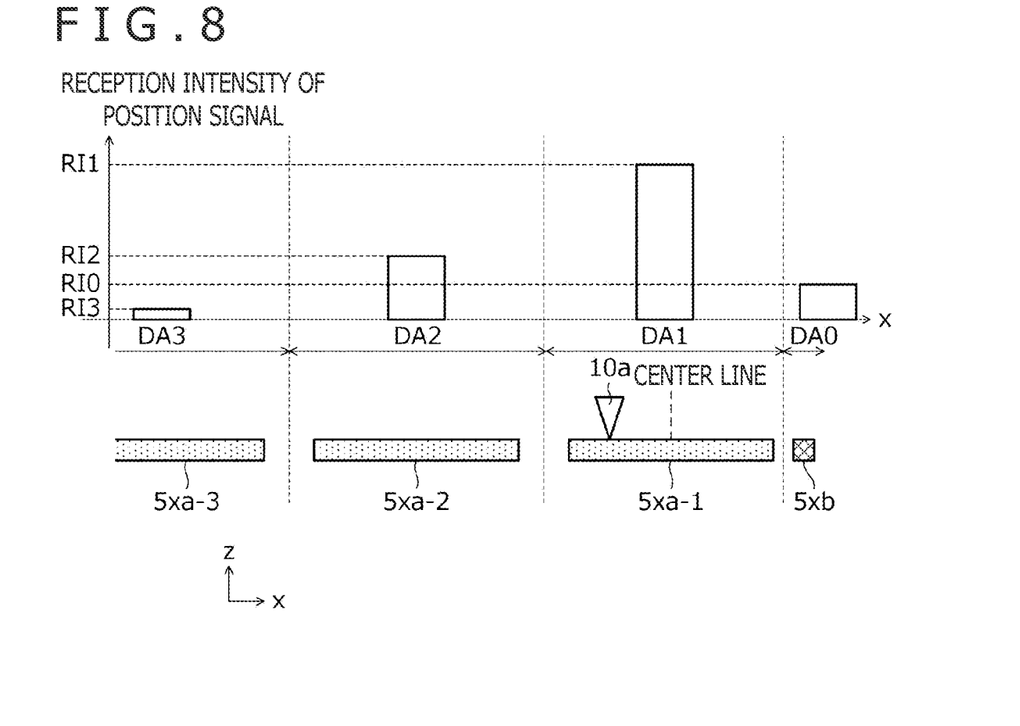
FIG. 8 is a diagram for explaining detection of an indicated position by the sensor controller.

FIG. 7 illustrates a case in which the pen tip 10a is located outside relative to the center line of the inside electrode 5xa-1 in the x-direction in the region DA1. FIG. 8 illustrates a case in which the pen tip 10a is located inside relative to the center line of the inside electrode 5xa-1 in the x-direction in the region DA1. In these cases, the reception intensity RI0 of the position signal at the outside electrode 5xb is necessary to allow the sensor controller 4 to decide the x-coordinate of the pen tip 10a. That is, the sensor controller 4 that has detected the highest reception intensity RI1 by the inside electrode 5xa-1 needs to refer to the reception intensities RI0 and RI2 detected at two electrodes 5xb and 5xa-2, respectively, being present on both sides of the inside electrode 5xa-1 in order to detect the x-coordinate of the pen tip 10a.

Description will be specifically made. First, the sensor controller 4 compares the reception intensity RI0 and the reception intensity RI2. Then, in the case of RI0=RI2, the sensor controller 4 determines that the pen tip 10a is present above the center line of the inside electrode 5xa-1 in the x-direction. The sensor controller 4 in this case decides the x-coordinate of the center line of the inside electrode 5xa-1 in the x-direction as the x-coordinate of the pen tip 10a. Moreover, in the case of RI0>RI2 (FIG. 7), the sensor controller 4 determines that the pen tip 10a is present at a position that deviates from the center line of the inside electrode 5xa-1 in the x-direction toward the side of the outside electrode 5xb. The sensor controller 4 in this case determines also the magnitude of the deviation on the basis of the reception intensities RI0 and RI1 and decides the x-coordinate of the pen tip 10a on the basis of the result thereof. On the other hand, in the case of RI0<RI2 (FIG. 8), the sensor controller 4 determines that the pen tip 10a is present at a position that deviates from the center line of the inside electrode 5xa-1 in the x-direction toward the side of the inside electrode 5xa-2. The sensor controller 4 in this case also determines the magnitude of the deviation on the basis of the reception intensities RI1 and RI2 and decides the x-coordinate of the pen tip 10a on the basis of the result thereof.

As above, the outside electrode 5xb is used to decide the x-coordinate of the pen tip 10a when the pen tip 10a is present in the vicinity of the circumferential side Aa of the active area A (specifically, in the region DA1). This applies also to the other outside electrodes 5xc, 5yb, and 5yc, and they are used to decide the coordinate of the pen tip 10a when the pen tip 10a is present in the vicinity of the circumferential side Aa of the active area A.

Referring back to FIG. 1 to FIG. 4, the sensor controller 4 is configured to report, to the host processor 2, the coordinates indicating the indicated position of the active pen 10 and a finger of the user detected in the above-described manner and various kinds of data included in the data signal received from the active pen 10. Moreover, the sensor controller 4 is configured to acquire pen-down information indicating that the active pen 10 has gotten contact with the touch surface and pen-up information indicating that the active pen 10 has been separated from the touch surface on the basis of writing pressure data received from the active pen 10 and to make a report to the host processor 2 at each timing. Specifically, the sensor controller 4 may acquire the pen-down information when a writing pressure value indicated by the writing pressure data has changed from a predetermined value (for example, 0) to a value larger than the predetermined value, and acquire the pen-up information when the writing pressure value indicated by the writing pressure data has changed from a value other than the predetermined value (for example, 0) to the predetermined value.

The host processor 2 executes at least one of display of a pointer and generation of ink data in response to input of the coordinates from the sensor controller 4. The display of a pointer is executed by displaying a predetermined pointer image at a position corresponding to the input coordinates on the active area A of the display panel 3.

The ink data is data including control points configured by each of multiple coordinates sequentially supplied from the sensor controller 4 and curve data obtained by interpolating sections between the respective control points by predetermined interpolation curves. Regarding a finger of the user, the host processor 2 starts generation of the ink data with the start of input of coordinates being the trigger, and ends the generation of the ink data with the end of the input of coordinates being the trigger. On the other hand, regarding the active pen 10, the host processor 2 starts generation of the ink data with input of the pen-down information being the trigger, and ends the generation of the ink data with input of the pen-up information being the trigger. When generating the ink data regarding the active pen 10, the host processor 2 executes also control of the width and/or the transparency of curve data that configures the ink data on the basis of the writing pressure data received from the active pen 10, or the like. The host processor 2 executes rendering of the generated ink data to cause the display panel 3 to display the rendering result and cause its own memory to store the generated ink data.

As described above, according to the sensor panel 5 according to the present embodiment, the inside electrodes 5xa and 5ya are configured by mesh conductors or transparent conductors, whereas the outside electrodes 5xb, 5xc, 5yb, and 5yc are configured by solid conductors (non-transparent conductors). Thus, while the whole of the outside electrodes 5xb, 5xc, 5yb, and 5yc needs to be disposed outside the active area A, the width W2 of each of the outside electrodes 5xb, 5yb, and 5yc can be set considerably smaller than the width W1 of each of the multiple inside electrodes 5xa and 5ya. Therefore, as a result, the area of the part that needs to be set outside the active area A in the sensor panel 5 can be made smaller than the existing configuration. This makes it possible to implement further reduction in the width of the bezel of the electronic equipment 1 of a tablet type.

Although the preferred embodiment of the present disclosure has been described above, it is obvious that the present disclosure is not limited by such an embodiment at all and the present disclosure can be carried out in various modes without departing from the gist thereof.

For example, in the above-described embodiment, description has been made regarding the example in which each linear electrode 5y is extended to the outside in the x-direction relative to the outside electrodes 5xb and 5xc and each linear electrode 5x is extended to the outside in the y-direction relative to the outside electrodes 5yb and 5yc. However, the linear electrodes 5y and 5x may be formed to be shorter. This makes it possible to further reduce the area of the part that needs to be set outside the active area A in the sensor panel 5. In this case, when the sensor panel 5 is seen in the direction of the normal to the touch surface 26a, the interconnects 6x may overlap with the outside electrode 5yb or 5yc, and the interconnects 6y may overlap with the outside electrode 5xb or The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor panel which, in operation, overlaps with a display device and is connected to an integrated circuit that detects a position of an active pen at least in an active area of the display device, the sensor panel comprising: a plurality of first electrodes that each extend in a first direction, wherein the first electrodes are spaced apart from each other in a second direction different from the first direction; a plurality of first routing lines respectively corresponding to the plurality of first electrodes; and a plurality of second electrodes that each extend in the second direction, wherein the second electrodes are spaced apart from each other in the first direction, wherein the plurality of second electrodes is connected to the integrated circuit by second routing lines that are different from each other, wherein the plurality of first electrodes and the plurality of second electrodes overlap each other, wherein each of the plurality of first electrodes is connected to the integrated circuit by a corresponding one of the plurality of first routing lines, wherein the plurality of first electrodes includes first and second outside electrodes located at respective ends of the plurality of first electrodes in the second direction, and a plurality of first inside electrodes that are different from the first and second outside electrodes, wherein an entirety of each of the first and second outside electrodes is a solid conductor, and wherein each of the plurality of first inside electrodes is a mesh conductor.

2. The sensor panel according to claim 1,
wherein the plurality of second electrodes includes third and fourth outside electrodes located at respective ends of the plurality of second electrodes in the first direction, and a plurality of second inside electrodes that are different from the third and fourth outside electrodes,
wherein each the third and fourth outside electrodes is a solid conductor, and
wherein each the plurality of second inside electrodes is a mesh conductor.

3. The sensor panel according to claim 2,
wherein each the first and second routing lines is a solid conductor.

4. The sensor panel according to claim 2,
wherein each of the first to fourth outside electrodes is disposed outside the active area.

5. The sensor panel according to claim 2,
wherein a width of each of the first and second outside electrodes in the second direction is smaller than a width of each of the plurality of first inside electrodes in the second direction, and
wherein a width of each of the third and fourth outside electrodes in the first direction is smaller than a width of each of the plurality of second inside electrodes in the first direction.

6. The sensor panel according to claim 1,
wherein each of the first and second outside electrodes is disposed outside the active area.

7. The sensor panel according to claim 1,
wherein a width of each of the first and second outside electrodes in the second direction is smaller than a width of each of the plurality of first inside electrodes in the second direction.

8. A sensor panel which, in operation, overlaps with a display device and is connected to an integrated circuit that detects a position of an active pen at least in an active area of the display device, the sensor panel comprising: a plurality of first electrodes that each extend in a first direction, wherein the first electrodes are spaced apart from each other in a second direction different from the first direction; a plurality of first routing lines respectively corresponding to the plurality of first electrodes; and a plurality of second electrodes that each extend in the second direction, wherein the second electrodes are spaced apart from each other in the first direction, wherein the plurality of second electrodes is connected to the integrated circuit by second routing lines that are different from each other, wherein the plurality of first electrodes and the plurality of second electrodes overlap each other, wherein each of the plurality of first electrodes is connected to the integrated circuit by a corresponding one of the first routing lines, wherein the plurality of first electrodes includes first and second outside electrodes located at respective ends of the plurality of first electrodes in the second direction, and a plurality of first inside electrodes that are different from the first and second outside electrodes, wherein an entirety of each of the first and second outside electrodes is a non-transparent conductor, and wherein each of the plurality of first inside electrodes is a transparent conductor.

9. The sensor panel according to claim 8,
wherein the plurality of second electrodes includes third and fourth outside electrodes located at respective ends of the plurality of second electrodes in the first direction, and a plurality of second inside electrodes that are different from the third and fourth outside electrodes,
wherein each of the third and fourth outside electrodes is a the non-transparent conductor, and
wherein each of the plurality of second inside electrodes is a transparent conductor.

10. The sensor panel according to claim 9,
wherein each of the first and second routing lines is a non-transparent conductor.

11. An electronic equipment comprising: a sensor panel that overlaps with a display device; and an integrated circuit that is connected to the sensor panel, wherein the integrated circuit, in operation, detects a position of an active pen at least in an active area of the display device, wherein the sensor panel includes a plurality of first electrodes that each extend in a first direction, and a plurality of second electrodes that each extend in a second direction different from the first direction, wherein the plurality of first electrodes and the plurality of second electrodes overlap each other, wherein the first electrodes are spaced apart from each other in the second direction, wherein the second electrodes are spaced apart from each other in the first direction, wherein the sensor panel includes a plurality of first routing lines respectively corresponding to the plurality of first electrodes, wherein each of the plurality of first electrodes is connected to the integrated circuit by a corresponding one of the plurality of first routing lines, wherein the sensor panel includes a plurality of second routing lines respectively corresponding to the plurality of second electrodes, wherein each of the plurality of second electrodes is connected to the integrated circuit by a corresponding one of the plurality of second routing lines, wherein the plurality of first electrodes includes first and second outside electrodes located at respective ends of the plurality of first electrodes in the second direction, and a plurality of inside electrodes that are different from the first and second outside electrodes, wherein the plurality of inside electrodes includes a first inside electrode and a second inside electrode sequentially from a closest inside electrode to the first outside electrode, wherein an entirety of each of the first and second outside electrodes is a solid conductor, wherein each of the plurality of inside electrodes is a mesh conductor, wherein the integrated circuit, in operation, detects a reception intensity at each of the plurality of first electrodes regarding a position signal transmitted by the active pen, and wherein the integrated circuit, in operation, decides a position of the active pen in the second direction based on the reception intensity detected at each of the first outside electrode, the first inside electrode, and the second inside electrode when the reception intensity detected at the first inside electrode is highest among the reception intensity detected at each of the plurality of first electrodes.

12. An electronic equipment comprising: a sensor panel that overlaps with a display device; and an integrated circuit that is connected to the sensor panel, wherein the integrated circuit, in operation, detects a position of an active pen at least in an active area of the display device, wherein the sensor panel includes a plurality of first electrodes that each extend in a first direction, and a plurality of second electrodes that each extend in a second direction different from the first direction, wherein the plurality of first electrodes and the plurality of second electrodes overlap each other, wherein the first electrodes are spaced apart from each other in the second direction, wherein the second electrodes are spaced apart from each other in the first direction, wherein the sensor panel includes a plurality of routing lines respectively corresponding to the plurality of first electrodes, wherein each of the plurality of first electrodes is connected to the integrated circuit by a corresponding one of the plurality of routing lines, wherein the plurality of first electrodes includes first and second outside electrodes located at respective ends of the plurality of first electrodes in the second direction, and a plurality of inside electrodes that are different from the first and second outside electrodes, wherein the plurality of inside electrodes includes a first inside electrode and a second inside electrode sequentially from a closest inside electrode to the first outside electrode, wherein an entirety of each of the first and second outside electrodes is a non-transparent conductor, wherein each of the plurality of inside electrodes is a transparent conductor, wherein the integrated circuit, in operation, detects a reception intensity at each of the plurality of first electrodes regarding a position signal transmitted by the active pen, and wherein the integrated circuit, in operation, decides a position of the active pen in the second direction based on the reception intensity detected at each of the first outside electrode, the first inside electrode, and the second inside electrode when the reception intensity detected at the first inside electrode is highest among the reception intensity detected at each of the plurality of first electrodes.

* * * * *